Figure 1:
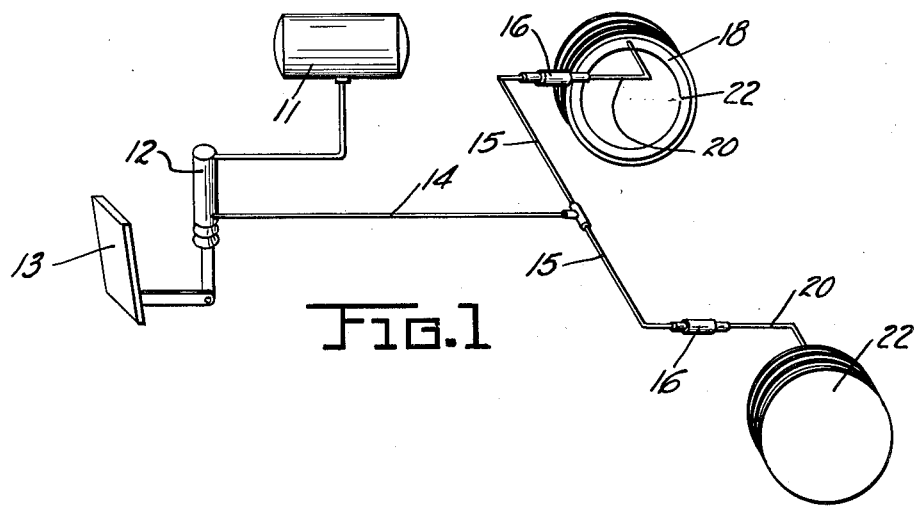

March 13, 1951  J. G. MARTIN  2,544,849

HYDRAULIC BRAKE AUTOMATIC ADJUSTER

Filed Jan. 23, 1946

INVENTOR.
JOHN G. MARTIN
BY
T. J. Plante
ATTORNEY

Patented Mar. 13, 1951

2,544,849

UNITED STATES PATENT OFFICE 2,544,849

HYDRAULIC BRAKE AUTOMATIC ADJUSTER

John G. Martin, South Bend, Ind., assignor to Bendix Aviation Corporation, South Bend, Ind., a corporation of Delaware Application January 23, 1946, Serial No. 642,819

6 Claims. (Cl. 60—54.5)

This invention relates to adjustors for hydraulically actuated brakes, and, more particularly, is concerned with hydraulic brake adjustors adapted to provide automatically the proper clearance in released position between rotatable and non-rotatable braking surfaces.

Inasmuch as the hydraulic brake adjustor herein proposed and described is not intended to compensate for or in any way be controlled by temperature variations in the operating parts, it will be appreciated that it is primarily applicable to and intended for disc brakes, rather than drum-type brakes. In drum brakes, expansion of the brake drum due to temperature increases can result in locking the brakes, if there is an automatic adjustment which causes the shoes to automatically change their released position whenever movement beyond a predetermined distance is required to obtain a full brake application. If the shoes are thus overadjusted, subsequent cooling of the drum will lock the brakes. In disc brakes, the expansion of the discs in an axial direction is so minor as to be almost negligible, and, furthermore, such expansion is in the direction of reducing the required travel of the brake applying means. Thus the danger of locking the brakes is not present where discs are used as the friction members, and a hydraulic automatic adjustment is quite feasible.

The automatic adjustor of the present application operates by metering hydraulic fluid from one side to the other of a valve which normally disconnects the master cylinder side of the system from the motor side of the system. If additional clearance develops in the brake, additional fluid is caused to pass the aforementioned valve to compensate for the brake wear reflected in the increased clearance.

Automatic adjustors operating on this general principle have heretofore been suggested. However, they have invariably been subject to certain defects which render them unreliable and inconsistent. In hydraulic automatic adjustors it is customary to utilize, as a measuring device for the fluid, a piston which reciprocates in a cylinder connected between the master cylinder and the motor. This piston customarily carries a valve which is normally closed but which is forced open to admit additional fluid after a predetermined amount of travel of the piston. Thus an additional amount of fluid is metered to the brakes to compensate for the additional clearance caused by wear during each brake application.

If the valve is so located and so associated with the piston that the pressure on the motor side tends to hold the valve closed while the pressure on the master cylinder side tends to open the valve, then there is the danger of causing the brakes to lock if the adjustor does not function satisfactorily. This locking results if the friction between the piston and the cylinder (due primarily to the sealing ring) is sufficient to prevent the piston from moving on the pressure stroke. In such a case, the master cylinder will force fluid past the valve and the fluid will be locked in the system with no available piston return movement to release the brakes. The possibility of such an occurrence depends upon the balance between the frictional opposition to movement of the piston, on the one hand, and the strength of the means which biases the valve to closed position, on the other hand. Although it will normally be planned that the means biasing the valve to closed position, such as the usual spring, will be of sufficient strength to hold the valve closed until after the friction has been overcome, this condition is hard, if not impossible, to guarantee because of unpredictable variations in the factors involved, particularly the frictional resistance to movement of the piston.

If the valve is so arranged that pressure on the master cylinder side tends to hold it closed while pressure on the motor side tends to open it, then there is the possibility that the automatic adjustment will cease to function satisfactorily. This result will occur if frictional resistance to movement of the piston prevents the piston from moving on the return stroke. In other words, if, after the brakes have been actuated and the piston in the automatic adjustor has been moved to the end of its stroke, the piston sticks and fails to return quickly to its original position upon release of the master cylinder pressure, then the pressure in the motor will force the valve in the adjustor open and return fluid directly to the master cylinder. If this happens the adjustor has failed entirely to serve its purpose, since subsequent application and release of the brake will be accomplished merely by forcing fluid back and forth past the valve in the automatic adjustor. It will, of course, be possible for master cylinder pressure to force fluid to the motor since, if the valve is temporarily closed under pressure, enough movement of the piston will be caused by the pressure to cause the mechanical valve opening means to reopen the valve. Thus, in this case there is no danger of complete failure of the hydraulic braking system, but it sometimes happens that it is relatively easy for the automatic adjustor to cease to function satisfactorily.

The primary object of the present invention is to provide a hydraulic automatic adjustor which will avoid the defects heretofore present in such adjustors, as explained in the preceding paragraphs.

A corollary object of the present invention is to obtain the object mentioned in the preceding paragraph by means of a device which is relatively simple and inexpensive.

Figure 2:
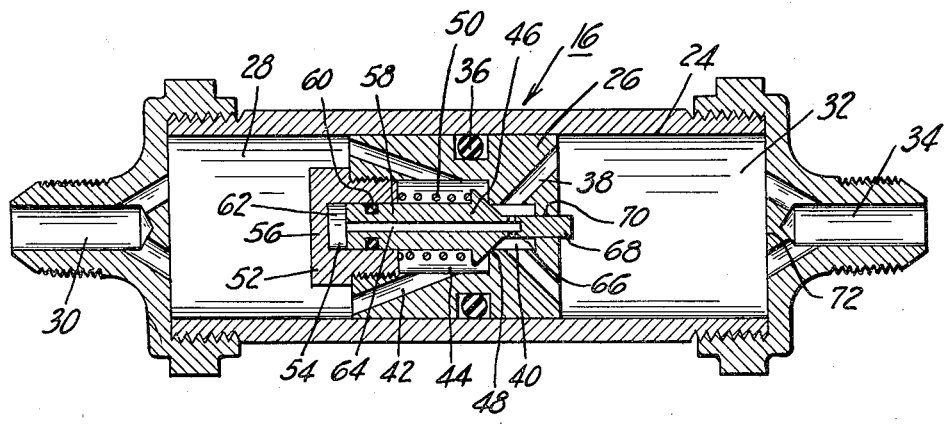

Other objects and features of the present invention will become apparent during the course of the following description, reference being had therein to the accompanying drawing, in which:

Figure 1 is a diagrammatic illustration of a hydraulic braking system incorporating my improved hydraulic automatic adjustor; and Figure 2 is an enlarged longitudinal cross-sectional view of the hydraulic automatic adjustor of Figure 1.

Referring to Figure 1, an operator controlled master cylinder 12 (having the usual reservoir 11 and pedal 13) is connected by means of a main conduit 14 and branch conduits 15 to the left end of each of two hydraulic automatic adjustors 16, and hydraulic applying motors 18 are connected by means of conduits 20 to the right end of each of the hydraulic automatic adjustors 16. The hydraulic brake applying motors 18 may be arranged to actuate disc brakes 22.

Referring now to Figure 2, each hydraulic automatic adjustor 16 has a bore 24 in which reciprocates a piston 26 dividing the bore into a chamber 28, which is connected through port 30 to conduit 15, and a chamber 32, which is connected through port 34 to conduit 20. The piston 26 carries the usual annular seal 36 which prevents the movement of fluid between chambers 28 and 32 via the unavoidable clearance between the outer cylindrical surface of piston 26 and the bore 24.

Passages 38 lead from chamber 32 into a chamber 40 formed in the interior of piston 26. Passages 42 lead from chamber 28 into a chamber 44, also formed in the interior of piston 26, chambers 44 and 40 being normally cut off from one another by means of a valve element 46 which contacts valve seat 48. A spring 50 biases valve member 46 to seated position.

The left end of piston 26 is tapped to receive a threaded plug 52. The plug 52 is hollowed out to provide a bore 54, the bore being closed at the left end by the wall 56 of the plug. Within bore 54 extends a plunger 58 which is directly associated with valve element 46, the plunger 58 and valve element 46 being formed as integral parts of a single member in the illustrated version of the device. An annular sealing member 60 prevents flow of fluid between a chamber 62 formed at the left end of plunger 58 and the chamber 44. However, a passage 64, extending longitudinally through plunger 58 and valve member 46, connects chamber 62 to a transverse passage 66 which in turn opens into chamber 40.

The diameters of plunger 58 and of valve seat 48 are substantially the same, thereby bringing about the hydraulic balancing of valve 46, with spring 50 as the only resultant force normally acting on the valve. The hydraulic pressure in chamber 28 is incapable of biasing the valve member 46 to closed position because of the plunger 58, and the hydraulic pressure in chamber 32 is incapable of opening the valve member 46, because if the pressure is increased in chamber 40, it is simultaneously increased in chamber 62 to balance the pressure increase acting on the combined valve member and plunger.

Valve member 46 is provided with a stem 68 which extends through an opening 70 in the right end of piston 26, and is adapted to contact the end wall 72 of cylinder 16 when piston 26 has moved sufficiently far toward the right. After the stem 68 of the valve contacts the wall of the cylinder, additional movement of piston 26 will cause the valve member 46 to leave its seat, compressing spring 50. Hydraulic fluid will therefore be permitted to move directly from chamber 28 into chamber 32 and thence to the hydraulic motor 18.

Operation of the hydraulic automatic adjustor is doubtless clear from the description hereinabove given, but a brief summary will be made. When the operator wishes to apply the brakes, he causes pressure to be built up in master cylinder 12. This results in fluid moving into chamber 28 of the hydraulic automatic adjustor and forcing piston 26 toward the right. Movement of the piston displaces fluid from chamber 32 to motor 18 and thus causes the brakes to be applied. If the brakes are fully applied before valve stem 68 contacts the end wall 72 of cylinder 16, then chambers 28 and 32 will be isolated from one another throughout the brake applying and releasing strokes. When the pressure in master cylinder 12 is released, the pressure in chamber 28 will be reduced, and the built up pressure in motor 18 and in chamber 32 will cause piston 26 to move back to the left to its retracted position.

Should the amount of clearance in the brakes be sufficient to require additional fluid after piston 26 has moved through its full pressure stroke, then, as explained above, contact of valve stem 68 with the end wall 72 of cylinder 16 will cause valve 46 to move away from its seat and permit fluid under pressure to flow directly from chamber 28 into chamber 32 and thus to motor 18. On the return stroke, this fluid will be trapped in chamber 32, because valve member 46 will move to seated position under the influence of spring 50 as soon as piston 26 starts to move toward the left. This means that an additional amount of fluid will be present on the motor side of piston 26, and the next application of the brakes will not require as much travel of the piston in master cylinder 12 as would have been the case if additional fluid had not been trapped on the motor side of the system. With this arrangement pedal travel is conserved, and brake clearance is kept to a minimum.

It will be apparent that the dangers discussed in explaining the objects of the present invention have been successfully eliminated by means of the present structure. Although the frictional resistance to movement of piston 26 is still present, it will be impossible for the friction to prevent piston 26 from moving in the proper manner. During the pressure stroke of the piston 26 the friction developed by sealing member 36 is overcome by the full pressure developed in master cylinder 12. During the return stroke of piston 26, the friction of piston 26 is overcome by the full force of the brake retracting springs. In either case, it is impossible for the hydraulic pressure to interfere with proper operation of valve member 46, because of the fully balanced nature of said valve member. If the piston tends to stick in retracted position, it will be impossible to force fluid through the valve to the motor cylinder and the entire master cylinder pressure will act to overcome the friction of the piston. On the other hand, if the piston tends to stick in fully applied position, the built up pressure in motor 18 will be incapable of opening valve 46, and the entire pressure of the retracting springs will act to overcome the piston friction. In other words, the delicate problem of balance between the piston friction and the strength of the spring biasing the valve to released position is entirely obviated by the present invention, and the valve may be said to be "hydraulically balanced."

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A hydraulic brake adjustor including a cylinder having an opening at one end adapted to receive a conduit extending to a master cylinder and having an opening at the other end adapted to receive a conduit extending to a hydraulic brake, a piston reciprocable in said cylinder having a normally closed passage therethrough, said piston being constructed to provide a valve seat encircling said passage and to provide an internal bore opposite the valve seat having the same effective area as said valve seat, said valve seat being nearer the brake-connected opening and said bore being nearer the master cylinder-connected opening, said bore being closed at the end farthest from said valve seat, a plunger reciprocable in said bore, a valve element integral with the plunger and adapted to contact the valve seat to close the aforementioned passage, a spring biasing the valve element to seated position, a passage extending through the plunger and the valve element to interconnect the underside of the valve element and the far end of the bore and thereby equalize the hydraulic pressures on the valve element, and a valve stem extending from said valve element toward the brake-connected end of the cylinder adapted to contact said end of the cylinder to open the valve near the end of the piston stroke.

2. A hydraulic brake adjustor including a cylinder having an opening at one end adapted to be connected to a pressure producing device and having an opening at the other end adapted to be connected to a hydraulic motor, a piston reciprocable in said cylinder having a passage therethrough, said piston being constructed to provide a valve seat encircling said passage and to provide an internal bore opposite the valve seat having the same effective area as said valve seat, said valve seat being nearer the brake-connected opening and said bore being nearer the master cylinder-connected opening, said bore being closed at the end farthest from said valve seat, a plunger reciprocable in said bore, a valve element carried by the plunger and adapted to contact the valve seat to close the aforementioned passage, a spring biasing the valve element to seated position, a passage extending through the plunger and the valve element to interconnect the underside of the valve element and the far end of the bore and thereby equalize the hydraulic pressures on the valve element, and abutment means between the valve element and the motor-connected end of the cylinder adapted to open the valve when the piston nears the end of its stroke.

3. A hydraulic brake adjustor including a cylinder having an opening at one end adapted to be connected to a pressure producing device and having an opening at the other end adapted to be connected to a hydraulic motor, a piston reciprocable in said cylinder having a passage therethrough, said piston being constructed to provide a valve seat encircling said passage and to provide an internal bore opposite the valve seat having the same effective area as said valve seat, said bore being closed at the end farthest from said valve seat, a plunger reciprocable in said bore, a valve element associated with the plunger and adapted to contact the valve seat to close the aforementioned passage, resilient means biasing the valve element to seated position, a passage extending through the plunger and the valve element to interconnect the underside of the valve element and the far end of the bore and thereby equalize the hydraulic pressures on the valve element, and a mechanical means for opening the valve when the piston nears the end of its stroke.

4. A hydraulic brake adjustor including a cylinder having an opening at one end adapted to be connected to a pressure producing device and having an opening at the other end adapted to be connected to a hydraulic motor, a piston reciprocable in said cylinder having a passage therethrough, a hydraulically balanced valve adapted to close the aforementioned passage and being incapable of being opened by hydraulic pressure acting thereagainst, resilient means biasing the valve element to closed position, and means for opening the valve when the piston has moved a predetermined distance on its pressure applying stroke.

5. A hydraulic brake adjustor including a cylinder having an opening at one end adapted to be connected to a pressure producing device and having an opening at the other end adapted to be connected to a hydraulic motor, a piston reciprocable in said cylinder having a passage therethrough, a valve element which is adapted to close said passage and which is provided with two oppositely-facing pressure responsive surfaces having substantially equal effective areas subjected to the hydraulic pressure prevailing at one side of the piston, thereby avoiding any substantial unbalancing force on said valve element due to the hydraulic pressures in the cylinder, resilient means biasing the valve element to closed position, and means for opening the valve when the piston has moved a predetermined distance on its pressure applying stroke.

6. A fluid pressure compensating device comprising a casing having an opening at one end adapted to be connected to a pressure producing device and having an opening at the other end adapted to be connected to a pressure receiving device, a pressure responsive member reciprocable in said casing forming a fluid tight chamber on each side thereof, said pressure responsive member being provided with a hydraulically balanced valve means which is actuable mechanically and is incapable of being actuated by hydraulic pressure for controlling fluid communication between said chambers, means yieldably urging said valve means to cut off such fluid communication, and means for opening said valve means when said pressure responsive member has moved a predetermined distance on its pressure delivering stroke.

JOHN G. MARTIN.

REFERENCES CITED

The following references are of record in the file of this patent:

UNITED STATES PATENTS

| Number | Name | Date |
|---|---|---|
| 2,345,811 | Harp | Apr. 4, 1944 |

FOREIGN PATENTS

| Number | Country | Date |
|---|---|---|
| 504,278 | Great Britain | Apr. 19, 1939 |